(12) United States Patent
     Kaneda

(10) Patent No.: US 12,658,667 B2
(45) Date of Patent: Jun. 16, 2026

(54) INTERLEAVED MULTI-PASS OPTICAL AMPLIFIER

(71) Applicant: Arizona Board of Regents on Behalf of the University of Arizona, Tucson, AZ (US)

(72) Inventor: Yushi Kaneda, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 596 days.

(21) Appl. No.: 18/245,841

(22) PCT Filed: Sep. 17, 2021

(86) PCT No.: PCT/US2021/050933
     § 371 (c)(1),
     (2) Date: Mar. 17, 2023

(87) PCT Pub. No.: WO2022/061154
     PCT Pub. Date: Mar. 24, 2022

(65) Prior Publication Data
     US 2024/0039237 A1      Feb. 1, 2024

Related U.S. Application Data

(60) Provisional application No. 63/080,377, filed on Sep. 18, 2020.

(51) Int. Cl.
     *H01S 3/23*          (2006.01)
     *H01S 3/10*          (2006.01)
(52) U.S. Cl.
     CPC ........ *H01S 3/2341* (2013.01); *H01S 3/10061* (2013.01); *H01S 2301/02* (2013.01)

(58) Field of Classification Search
     None
     See application file for complete search history.

(56) References Cited

U.S. PATENT DOCUMENTS

2002/0186380 A1* 12/2002 Drake, Jr. ................ G01H 9/00
                                              356/502
2005/0205811 A1* 9/2005 Partlo .................... B82Y 10/00
                                              250/504 R (Continued)

OTHER PUBLICATIONS

International Search Report and Written Opinion mailed Dec. 17, 2021 for International Patent Application No. PCT/US2021/050933 (13 pages).

*Primary Examiner* — Kristy A Haupt
(74) *Attorney, Agent, or Firm* — Perkins Coie

(57)          ABSTRACT

The described methods and devices minimize or reduce the effects of the leading amplified spontaneous emission component of an optical pulse in optical multi-pass amplifier systems. One multi-pass optical amplifier includes a gain medium positioned to receive a pump laser, and to receive an optical pulse having a main component and one or both of a leading or a trailing component. The optical amplifier also includes one or more reflectors positioned at a first side or at a second side of the gain medium that allow multi-pass propagation of the optical pulse through the gain medium. The one or more reflectors are positioned to allow the main component of the optical pulse to traverse through the gain medium in a first pass before the leading component of the optical pulse reaches the gain medium in a second pass through the gain medium.

20 Claims, 7 Drawing Sheets

(56)     References Cited

U.S. PATENT DOCUMENTS

2018/0001417  A1*     1/2018   Dulaney  ............. H01S 3/08031
2019/0067897  A1      2/2019   Starodoumov et al.

* cited by examiner

Order in which each
section enters G and
experiences the gain:

In conventional amplifier:
111122223333

In interleaved amplifier:
123123123123

INTERLEAVED MULTI-PASS OPTICAL AMPLIFIER

CROSS-REFERENCE TO RELATED APPLICATION(S)

This patent document is a 371 National Phase Application of International Patent Application No. PCT/US2021/050933, filed Sep. 17, 2021, which claims priority to the provisional application with Ser. No. 63/080,377 titled "INTERLEAVED MULTI-PASS OPTICAL AMPLIFIER," filed Sep. 18, 2020. The entire contents of the above noted applications are incorporated by reference as part of the disclosure of this document.

TECHNICAL FIELD

The disclosed technology relates to multi-pass optical amplifiers.

BACKGROUND

Optical amplifiers are devices that receive input signals, typically in the form of a laser beam, and generate output signals having a higher optical power. Amplification occurs when the input beam traverses through a gain medium, which is pumped by an external source, e.g., a pump laser. Further amplification of the signal can be effectuated when the beam travels multiple times through the gain medium. However, in the presence of unwanted signals such as various noise components, each pass through the gain medium also amplifies the undesired signal components, which can render the amplifier inefficient or even inoperable.

SUMMARY

The disclosed embodiments relate to optical amplifier systems and methods, which among other features and benefits, minimize or reduce the effects of the leading amplified spontaneous emission component with respect to the gain experienced by the main pulse in optical multi-pass amplifier configurations. One example multi-pass optical amplifier includes a gain medium that is positioned to receive light associated with a pump laser, and to receive an optical pulse. The optical pulse includes a main component and one or both of a leading component or a trailing component, where a peak power level of the leading or the trailing components is less than a peak value of the main component. The multi-pass optical amplifier also includes one or more reflectors positioned at a first side or at a second side of the gain medium to allow multi-pass propagation of the optical pulse through the gain medium. The one or more reflectors are positioned at one or more distances from the gain medium to allow the main component of the optical pulse to substantially completely traverse through the gain medium as part of a first pass through the gain medium before the leading component of the optical pulse reaches the gain medium in a second pass through the gain medium.

DETAILED DESCRIPTION

Figure 1:
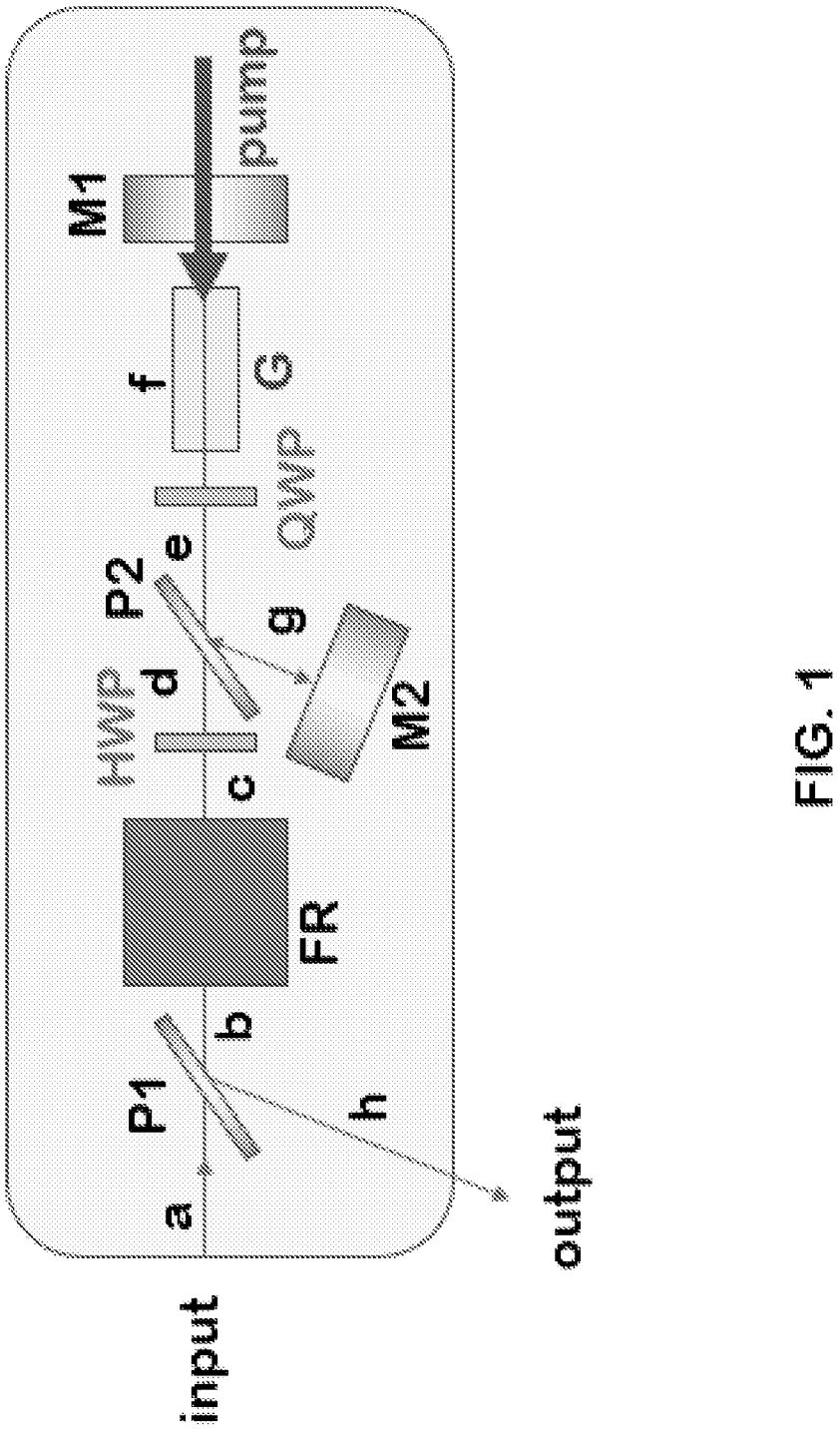
FIG. 1 illustrates an example four-pass optical amplifier configuration in which the signal passes through a gain medium four times before exiting the amplifier.

Optical amplifiers are often configured in multi-pass configurations with overlapping beams from different passes, such as double-pass (2-pass) or quad-pass (4-pass). The input to such amplifiers can be the output of a pre-amplifier, which may not have a high output power; but because the amplifier provides a high gain, the initial input can be low. In one configuration of the pre-amplifier (described by the way of example and not by limitation), a diode laser can be driven by a pulsed injection current, providing a peak power of 100 mW or so. The pulse width can be 100-200 ps with commercial driving electronics. The desired pulse repetition rate in this particular example is 10 kHz. The pulse energy (with a pulse width of 100 ps) is 10 pJ and the average power is 0.1 μW. This average power cannot saturate a typical solid-state amplifier, which can have a high saturable power, but provides an unsaturated gain that is not very high. Therefore, it is desirable to use a high-gain pre-amplifier to bring the input power to the solid-state amplifier to a power level that can saturate the solid-state amplifier.

However, due to the strong emission of the gain materials (e.g., semiconductor quantum wells or doped fibers), the amplifier emits unwanted components in the form of amplified spontaneous emission (ASE). In order to take full advantage of the solid-state amplifier, such unwanted ASE should be eliminated. In some cases, the pre-amplifier can be driven in a pulsed format to eliminate the unwanted emissions between the pulses. However, because the pre-amplifier must be activated prior to the arrival of the signal pulse, a small amount of ASE is produced briefly before (typically 1 to 2 ns) the signal pulse is applied. In an example configuration, where the pre-amplifier uses a semiconductor tapered amplifier device, 200 uW of ASE (or 0.01% of signal power) is expected prior to the arrival of the signal pulse. The pulse signal can be amplified to 2-3 W, but compared to a 100 ps pulse (200-300 pJ), a 2 ns-long ASE leading edge can contain as much as 0.4 pJ (or 0.2%) of the signal pulse energy. This leading edge can grow more than the main pulse grows during amplification, which is unwanted. This effect, the difference in gain for the leading edge and the main pulse, is not pronounced in the unsaturated regime where both the main pulse and the leading edge (as well as the trailing edge) would see virtually the same gain. However, as the amplifier starts to be saturated, the portion of the signal that arrives first (i.e., the leading edge) experiences a higher gain. As a result, especially in multi-pass amplifiers, the leading edge grows (is amplified) more than the main pulse, eventually outgrowing the main pulse. The resulting pulse would mainly include the unwanted component (amplified leading edge), thus effectively disabling the main pulse.

The disclosed embodiments relate to optical amplifier configurations wherein, among other features and benefits, the leading edge does not necessarily experience a high unsaturated gain in solid-state multi-pass amplifiers. This can be applied to laser sources wherein a seed is pulsed, and it includes a small amount of unwanted emissions within the gain bandwidth of the solid-state media in the brief period preceding the signal pulse. The unwanted components preceding the main pulse may be amplified spontaneous emission (ASE) from a previous stage of the pre-amplifier, such as in semiconductor amplifiers or fiber amplifiers.

In some embodiments, the input pulse train has a leading ASE component (e.g., approximately 1.5 ns), with its peak approximately 3 orders of magnitude lower than the peak power of the main signal. The systems and methods of the disclosed embodiments, among other features and benefits, minimize or reduce the effects of the leading ASE component with respect to the gain experienced by the main pulse.

FIG. 1 illustrates a 4-pass amplifier in which the signal passes through a gain medium four times before exiting the amplifier. In particular, in the example configuration of FIG. 1, the signal enters the amplifier from the left. For instance, this signal in this example has a horizontal polarization. The signal goes through the first polarizer P1, which allows the signal to be transmitted therethrough toward the Faraday rotator (FR), which rotates the polarization angle by 45 degrees. After propagating through the half waveplate (HWP), the polarization is rotated back to horizontal polarization, and the signal passes through the second polarizer P2, and through the quarter waveplate (QWP), and makes its first pass through the gain medium (G). The signal exiting G is reflected by the first retroreflector M1 and propagates from left to right, passes through G, QWP and is now vertically polarized. The signal then reflects from P2 towards the second retroreflector M2, is reflected back by M2 and reflected again by P2 to make its third pass through G (entering G on the left, and exiting on the right). The signal is then reflected by M1, and makes a fourth pass through G. The signal that is incident on P2 from right has horizontal polarization, and passes through P2, becomes 45-degree polarized by HWP and becomes vertically polarized by FR. The signal exiting FR from the left side is reflected by P1 and forms the amplified output beam.

FIG. 1 is further annotated with labels a-h, which along with the table below, illustrate the changes to the beam polarization as it goes through the four-pass amplifier configuration.

| Pass # | location | Direction | Polarization |
|---|---|---|---|
| 1 | a-b | right | H |
| | | Faraday Rotator | |
| | c | right | 45 deg. |
| | | HWP | |
| | d-e | right | H |
| | | QWP | |
| | f | right | circular |
| 2 | f | left | |
| | | QWP | |
| | e-g | Left/down | V |
| 3 | g-e | Up/right | |

4

-continued

| Pass # | location | Direction | Polarization |
|---|---|---|---|
| | | QWP | |
| | f | right | circular |
| 4 | f | left | |
| | | QWP | |
| | e-d | left | H |
| | | HWP | |
| | c | Left | 45 deg. |
| | | Faraday Rotator | |
| | b-h | Left/down | V |

Figure 2:
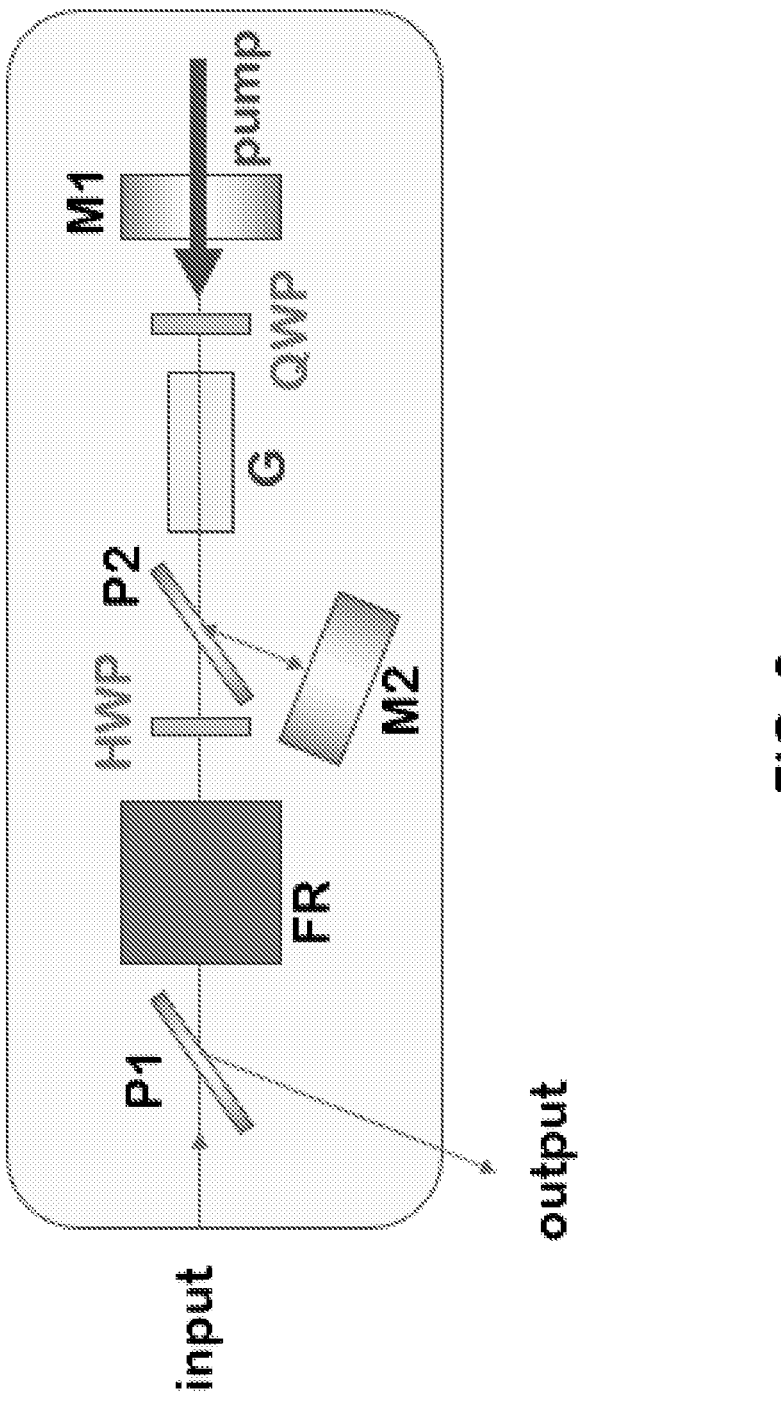
FIG. 2 illustrate an alternate example of a four-pass optical amplifier configuration.

It should be noted that in the above configuration, the QWP can be alternatively positioned between G and M1 to allow only linearly polarized light to pass through G, as illustrated in FIG. 2. In this alternate configuration, however, the pump laser must pass through QWP before entering G, which may not be desirable. In particular, in such configurations, the QWP may need to include antireflection coatings to allow both the pump laser and the optical pulse to transmit therethrough, which increases the cost and complexity of the device, and will reduce the pump power that reaches the gain medium.

Figure 3:
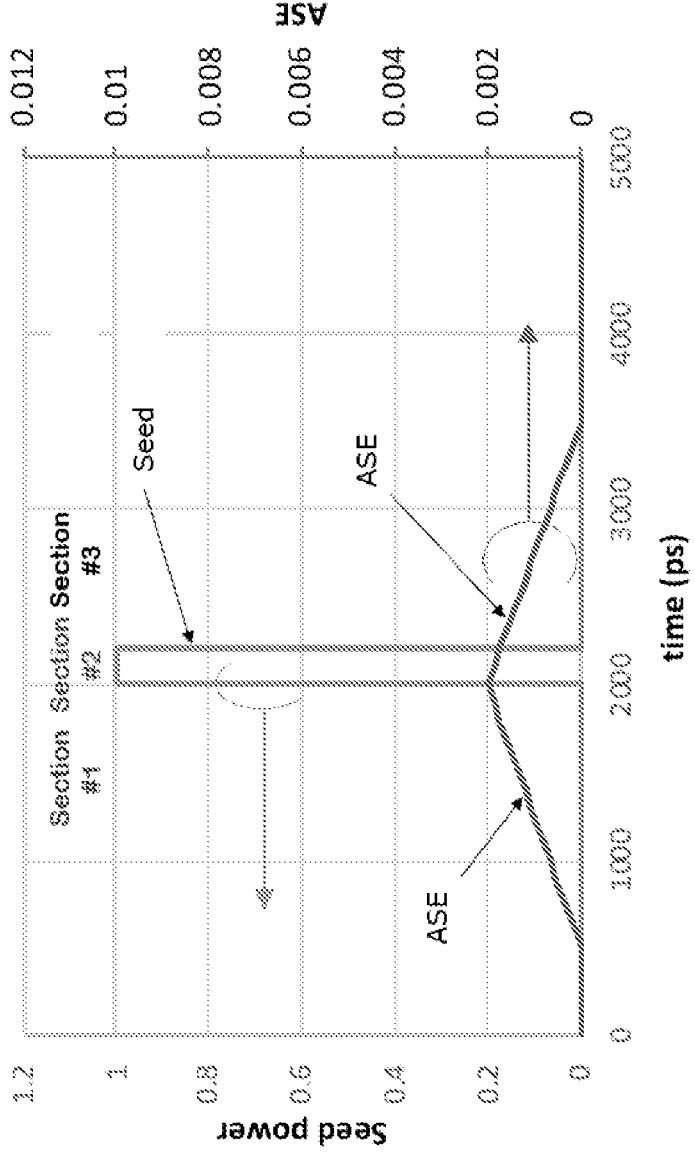
FIG. 3 illustrates a plot of an example a pulse input to an optical amplifier that includes a main pulse, as well as amplified spontaneous emission (ASE) components.

In the four-pass configurations described above, the ASE component present on the leading edge of the main pulse (i.e., the edge that enters the gain medium first) can experience a high gain at each of the passes through the gain medium, thereby dominating the output of the amplifier. To illustrate this unwanted amplification, FIG. 3 shows a plot of an example a pulse input to the amplifier that includes a main pulse—section #2—e.g., seed pulse having a normalized power of 1, and a width of about 200 ps. This pulse also includes unwanted ASE components (sections #1 and #3) on each edge of the main pulse. These unwanted components, while small in amplitude when entering the amplifier (e.g., peak normalized value of 0.002), can have a larger duration (e.g., 1.5 ns or more) compared to the main pulse. In a conventional amplifier, the ASE on the leading edge of the main pulse enters the gain medium first, is amplified first and thus deprives the main section of the pulse from experiencing gain as the amplifier saturates. In FIG. 3, the order in which the different sections of the pulse enter the gain medium are illustrated in the inset. As illustrated, in each of the first through fourth passes through the gain medium, section #1 enters the gain medium first (i.e., 1111), section #2 enters the gain medium next (i.e., 2222) and section #3 enters the gain medium last (i.e., 3333).

According to the disclosed embodiments, in an interleaved 4-pass amplifier, the distances between the various components of the 4-pass amplifier can be chosen so that the main pulse arrives and experiences the gain of the gain medium before the leading ASE enters the gain medium as part of the second pass. In this way, the main pulse during the passage experiences a substantial amount of gain as opposed to the previous configurations, where the leading ASE would deplete the gain before allowing the main pulse to be sufficiently amplified. The same applies to the retroreflector; it can be placed so that the ASE associated with the third pass arrives at the gain medium after the main pulse has experienced gain as part of the second pass. For example, with the duration of the leading pulse of approximately 2 ns, the gain media and reflectors should be more than 30 cm away from each other. It should be noted that the 30 cm distance is associated with a path length of 60 cm, because the light travels back and forth between the two components.

For the purposes of illustration and not by limitation, in one modeling of the apparatus, we assumed a 10 kHz repetition frequency, a mode cross section at the gain crystal of $5 \times 10^{-4}$ cm$^2$ (125 μm radius), 2890 W/cm$^2$ of saturation intensity and 230 μs of upper state lifetime.

The input pulses included 3 nW of preceding ASE (0.3 pJ), 6 uW (600 pJ) of main pulse, and 3 nW (0.3 pJ) of trailing ASE. These ASE powers/energies were selected based on information obtained from datasheet of a semiconductor tapered amplifier, and are believed to be reasonable assumptions as the "in-band" component for the Nd:YAG gain band.

Figure 4:
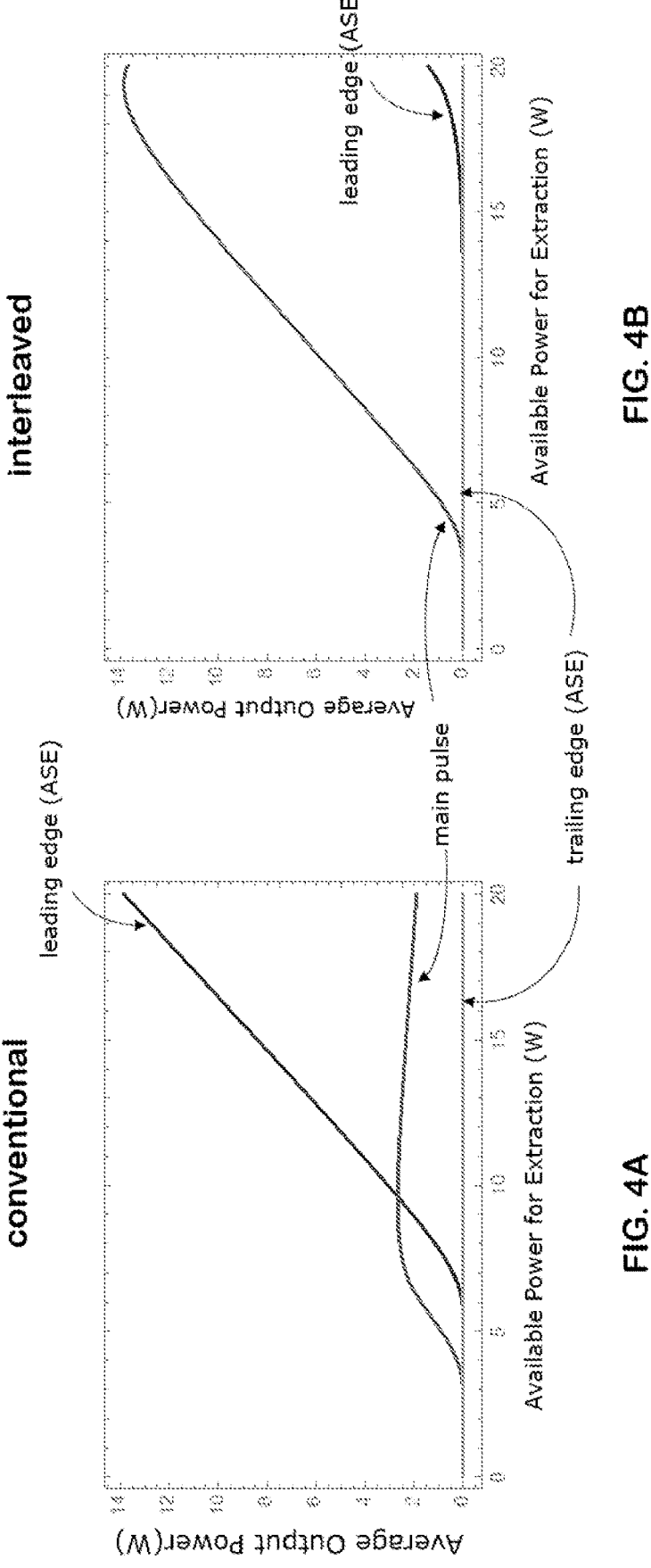
FIG. 4A illustrates an example plot of output energies of the leading edge ASE pulse, main pulse, and the trailing edge ASE pulse in a conventional multi-pass amplifier system.
FIG. 4B illustrates an example plot of output energies of the leading edge ASE pulse, main pulse, and the trailing edge ASE pulse in an interleaved multi-pass amplifier system in accordance with the disclosed technology.

FIG. 4A shows the output energies of the leading edge (ASE) pulse, main pulse, and trailing edge (ASE) pulse. In the modeling, each section of the pulse is assumed to make 4 passes before the next section arrives at the gain material, which is the case in configurations where the reflectors are positioned close to the gain material. As can be seen, as the leading pulse starts to saturate the amplifier, the energy of the main pulse stops growing, and as the leading pulse grows, the main pulse actually decreases.

FIG. 4B, illustrates a similar plot as in FIG. 4A for an example interleaved configuration in accordance with the disclosed embodiments. In this configuration, the model is constructed such that the ASE sections of the next pass enter the gain medium after the main pulse of the previous pass has fully traversed the gain medium. As evident from FIG. 4B, the main pulse can grow much further to higher output energies as compared to FIG. 4A before the (unwanted) leading pulse becomes significant, thus illustrating the effectiveness of the disclosed technology.

Figure 5:
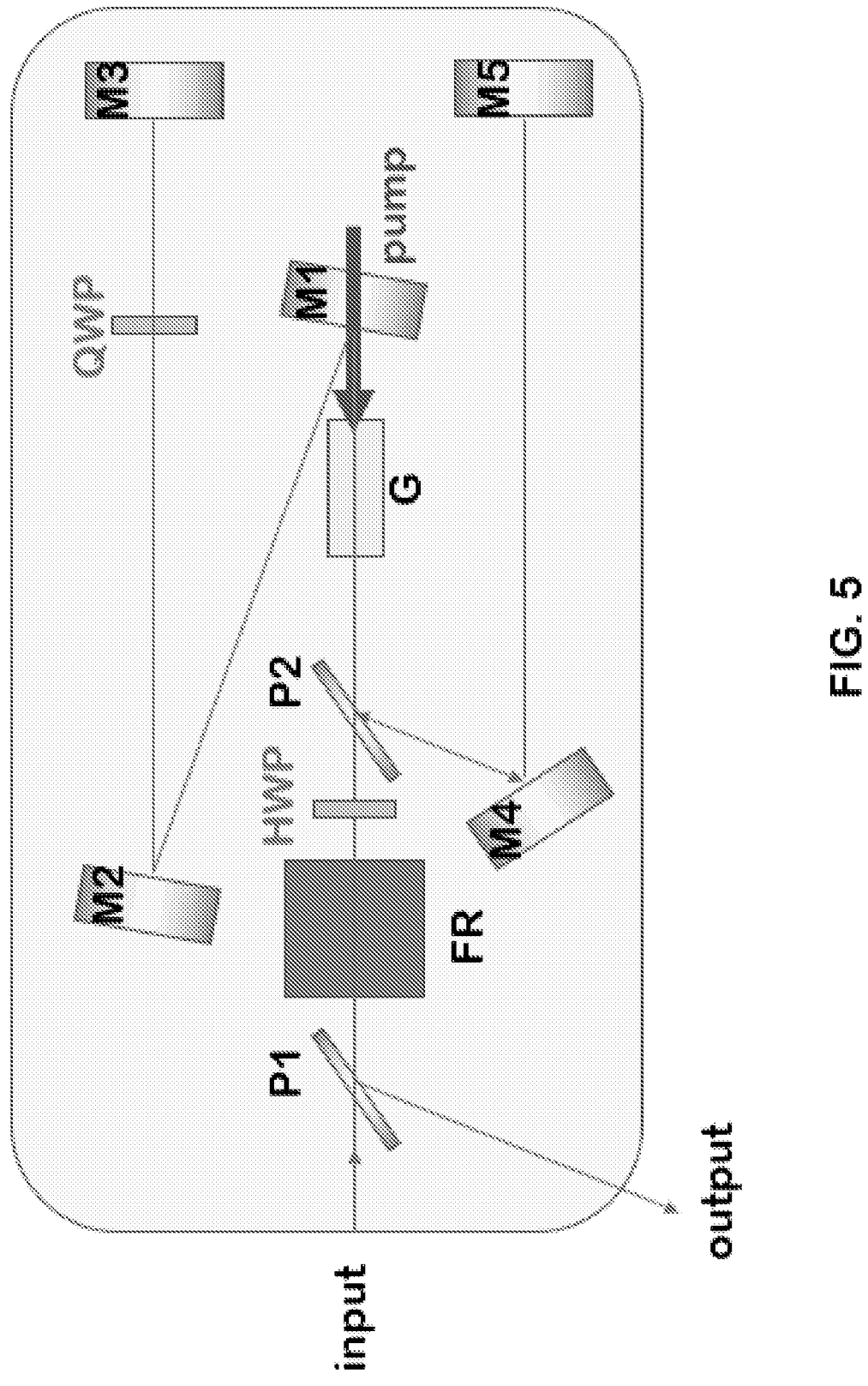
FIG. 5 illustrates a four-pass amplifier in accordance with an example embodiment.

FIG. 5 illustrates a four-pass amplifier in accordance with an example embodiment that allows the main pulse to be amplified while minimizing the amplification of unwanted components of the seed pulse. In this configuration, reflectors M2, M3 and M5 are added, and M1 is rotated to allow light that is incident thereon from the left side to be reflected toward M2, which is then reflected toward QWP, which is positioned between M2 and M3. In the bottom section, M4 is rotated (compared to FIGS. 1 and 2) to allow light that is reflected from P2 toward M4 to be reflected toward M5, and be reflected back toward M4. As evident from FIG. 5, the pump reaches the gain medium without passing through the QWP (compare with FIG. 2). In an example, with the duration of the leading pulse of approximately 2 ns, each of the distances between G to M3 and G to M5 should be 30 cm or longer. In this way, the leading ASE pulse only returns to G after 2 ns, when the main pulse has already gone through G. It should be noted that the choice of this length (e.g., 30 cm) is related to the length of the ASE duration, which depends on the particular pre-amplifier. In this example scenario, the ASE duration of about 1.5-2 ns is assumed, which corresponds to commercially available driving electronics. In this configuration, the optical path is folded (using mirrors M2, M3 and M5) in order to produce a more compact configuration. It should be noted, however, that if the size of the amplifier is not a critical issue, the amplifier can be designed with unfolded optical paths, or with fewer folded paths. The inset in FIG. 3 provides the order in which the different sections of the pulse enter the gain medium in different paths through the interleaved amplifier.

Figure 6:
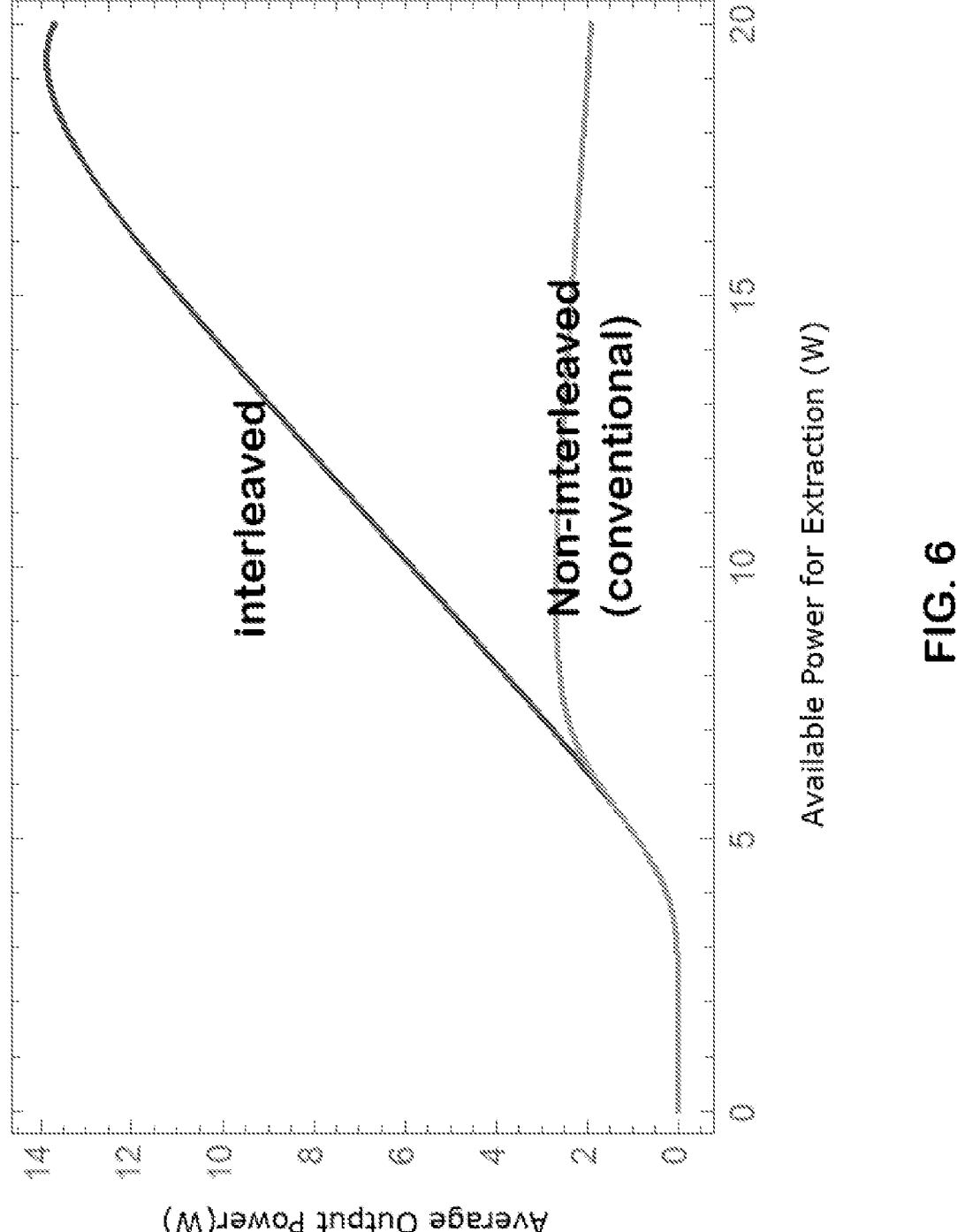
FIG. 6 illustrates a comparison plot of the main pulse amplification for a multi pass interleaved multi-pass optical amplifier in accordance with an example embodiment and a conventional multi-pass optical amplifier.

FIG. 6 illustrates a comparison plot of the main pulse amplification for the conventional and for the multi-pass interleaved optical amplifier. As evident from the plot, the output average power that is contained in the main pulse is significantly increased with the interleaved amplifier.

It should be noted that the above description regarding a four-pass amplifier is provided by the way of example and not by limitation, and the disclosed technology is equally applicable to other variations of the four-pass amplifiers and other multi-pass amplifiers. For example, in an alternate configuration of FIG. 5, a second Faraday rotator can be used in place of the QWP. The key is to change H-polarization to V-polarization, and vice versa, when the optical pulse travels back and forth. While QWPs may be currently cheaper to implement than FRs, is some current or future implementations FRs can be used.

Figure 7:
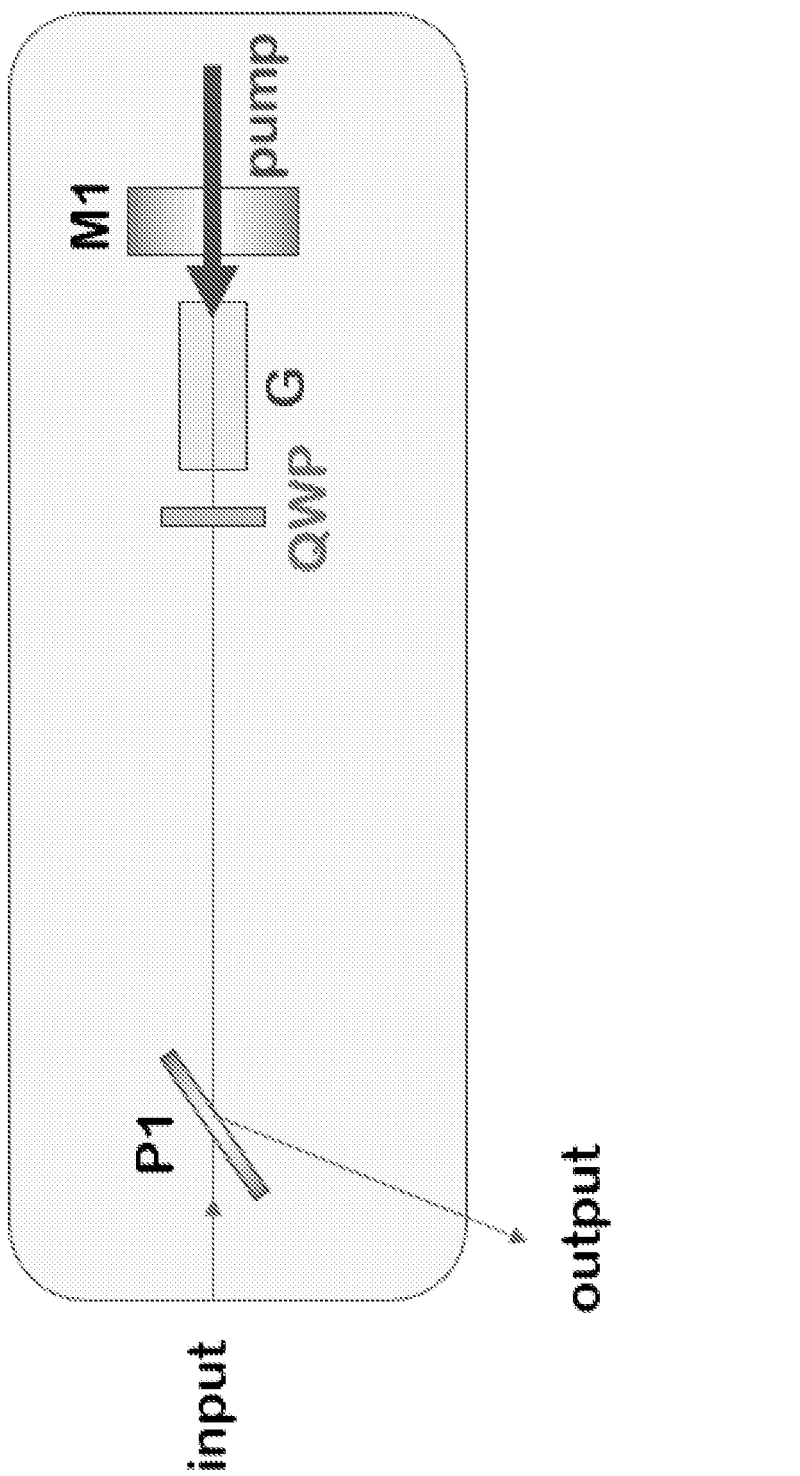
FIG. 7 illustrates an example of an interleaved double-pass amplifier in accordance with an example embodiment.

FIG. 7 illustrates an example of an interleaved double-pass amplifier in accordance with an example embodiment. The components in this configuration are similar to those in FIG. 5, except the components FR, HWP, P2 and M2 are removed. In this configuration, the light exits the amplifier after traversing twice through the gain medium. As discussed in connection with previous configurations, by adjusting the distance between G and M1, the system can be configured to allow the main pulse to arrive and experience the gain of the gain medium before the leading ASE enters the gain medium as part of the second pass.

One aspect of the disclosed technology relates to a multi-pass optical amplifier that includes a gain medium positioned to receive light associated with a pump laser, and to receive an optical pulse comprising a main component, and one or both of a leading component or a trailing component, wherein a peak power level of the leading or the trailing components is less than a peak value of the main component. The multi-pass optical amplifier also includes one or more reflectors positioned at a first side or at a second side of the gain medium to allow multi-pass propagation of the optical pulse through the gain medium. The one or more reflectors are positioned at one or more distances from the gain medium to allow the main component of the optical pulse to substantially completely traverse through the gain medium as part of a first pass through the gain medium before the leading component of the optical pulse reaches the gain medium in a second pass through the gain medium.

In one example embodiment, a length of a path for light to traverse between the first or the second side of the gain medium and back to the gain medium from the second side is longer than at least half of a length of the optical pulse. In another example embodiment, the length of the optical pulse includes a length starting from beginning of the optical pulse to a location of a peak of the optical pulse. According to another example embodiment, the multi-pass optical amplifier is configured to receive the optical pulse from a pre-amplifier. In yet another example embodiment, the multi-pass optical amplifier is configured to receive the optical pulse from a semiconductor amplifier driven by a pulsed current. In still another example embodiment, the multi-pass optical amplifier is configured to receive the optical pulse from a fiber amplifier pumped by a pulsed pump source.

In another example embodiment, a duration of the main component of the optical pulse input to the multi-pass optical amplifier is shorter than 1 nanosecond. In one example embodiment, a duration of the leading or the trailing component of the optical pulse input to the multi-pass optical amplifier is more than 1 nanosecond and less than 10 nanoseconds. In another example embodiment, a duration of the main component of the optical pulse is less than 500 picoseconds and a duration of the leading or the trailing component of the optical pulse input to the multi-pass optical amplifier is more than 1 nanosecond and less than 2 nanosecond. In still another example embodiment, the one or more distances are selected to allow the main component of the optical pulse to substantially completely traverse through the gain medium as part of a current pass through the gain medium before the leading component of the optical pulse reaches the gain medium as part of a subsequent pass through the gain medium, wherein the current pass is the second pass or higher.

According to one example embodiment, the one or more reflectors are positioned at the one or more distances to allow the entire optical pulse to substantially completely traverse through the gain medium during a first pass through the gain medium before the leading component of the optical pulse reaches the gain medium in a second pass through the gain medium.

In another example embodiment, the multi-pass optical amplifier is a four-pass optical amplifier. In one example configuration, the four-pass optical amplifier includes: five mirrors; two retarder elements, each configured to modify a polarization of light incident thereon; and two polarizers configured to allow light having a first polarization state to propagate therethrough and light having a second polarization state to reflect therefrom. In this example configuration, two of the five mirrors and a first one of the two retarder elements are positioned on the first side of the gain medium, and three of the five mirrors and a second one of the retarder elements are positioned on the second side of the gain medium. In one example embodiment, a first polarizer is positioned to receive the optical pulse, a Faraday rotator is positioned between the first polarizer and the first retarder element, wherein the first retarder element includes a half waveplate (HWP), a second polarizer is positioned between the first retarder element and the first side of the gain medium, a first mirror is positioned to receive light that exits the gain medium from the second side and to reflect it at an angle to a second mirror, a third mirror is positioned to receive light upon reflection from the second mirror and passage through the second retarder element that includes a quarter waveplate (QWP), and a fourth mirror positioned to receive light that is reflected from the second polarizer and direct light reflected therefrom to a fifth mirror that is configured to reflect light received thereon toward the fourth mirror.

In yet another example embodiment, a distance between the gain medium and the third mirror or a distance between the gain medium and the fifth mirror is selected to be greater than a predetermined value that causes the main component of the optical pulse to substantially completely traverse through the gain medium as part of a current pass through the gain medium before the leading component of the optical pulse reaches the gain medium as part of a subsequent pass through the gain medium, wherein the current pass is the second pass or higher. In still another example embodiment, the optical pulse input to the multi-pass optical amplifier is linearly polarized. In one example embodiment, the second retarder element does not receive light from a laser pump source. In another example, embodiment, the one or more reflectors are positioned at the one or more distances from the gain medium to enable the main component of the optical pulse to be amplified while amplification of the leading or trailing components are minimized after multiple passes through the gain medium.

According to another example embodiment, the multi-pass optical amplifier is a double-pass optical amplifier. In one example embodiment, the double-pass optical amplifier includes a polarizer configured to receive the optical pulse, a quarter waveplate (QWP) positioned between the first side of the gain medium and the polarizer, and a mirror positioned to receive light that exits the gain medium at the second side of the gain medium, and to reflect the light received therein back toward the second side of the gain medium.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A multi-pass optical amplifier, comprising:
   a gain medium positioned to receive light associated with a pump laser, and to receive an optical pulse comprising a main component, and one or both of a leading component or a trailing component, wherein a peak power level of the leading or the trailing components is less than a peak value of the main component; and
   one or more reflectors positioned at a first side or at a second side of the gain medium to allow multi-pass propagation of the optical pulse through the gain medium, wherein
   the one or more reflectors are positioned at one or more distances from the gain medium to allow the main component of the optical pulse to substantially completely traverse through the gain medium as part of a first pass through the gain medium before the leading component of the optical pulse reaches the gain medium in a second pass through the gain medium.

2. The multi-pass optical amplifier of claim 1, wherein a length of a path for light to traverse between the first or the second side of the gain medium and back to the gain medium from the second side is longer than at least half of a length of the optical pulse.

3. The multi-pass optical amplifier of claim 2, wherein the length of the optical pulse includes a length starting from beginning of the optical pulse to a location of a peak of the optical pulse.

4. The multi-pass optical amplifier of claim 1, wherein the multi-pass optical amplifier is configured to receive the optical pulse from a pre-amplifier.

5. The multi-pass optical amplifier of claim 1, wherein the multi-pass optical amplifier is configured to receive the optical pulse from a semiconductor amplifier driven by a pulsed current.

6. The multi-pass optical amplifier of claim 1, wherein the multi-pass optical amplifier is configured to receive the optical pulse from a fiber amplifier pumped by a pulsed pump source.

7. The multi-pass optical amplifier of claim 1, wherein a duration of the main component of the optical pulse input to the multi-pass optical amplifier is shorter than 1 nanosecond.

8. The multi-pass optical amplifier of claim 7, wherein a duration of the leading or the trailing component of the optical pulse input to the multi-pass optical amplifier is more than 1 nanosecond and less than 10 nanoseconds.

9. The multi-pass optical amplifier of claim 1, wherein a duration of the main component of the optical pulse input to the multi-pass optical amplifier is less than 500 picoseconds and a duration of the leading or the trailing component of the optical pulse input to the multi-pass optical amplifier is more than 1 nanosecond and less than 2 nanosecond.

10. The multi-pass optical amplifier of claim 1, wherein the one or more distances are selected to allow the main component of the optical pulse to substantially completely traverse through the gain medium as part of a current pass through the gain medium before the leading component of the optical pulse reaches the gain medium as part of a subsequent pass through the gain medium, wherein the current pass is the second pass or higher.

11. The multi-pass optical amplifier of claim 1, wherein the one or more reflectors are positioned at the one or more distances to allow the entire optical pulse to substantially completely traverse through the gain medium during a first pass through the gain medium before the leading component of the optical pulse reaches the gain medium in a second pass through the gain medium.

12. The multi-pass optical amplifier of claim 1, wherein the multi-pass optical amplifier is a four-pass optical amplifier.

13. The multi-pass optical amplifier of claim 12, wherein four-pass optical amplifier includes:

five mirrors;

two retarder elements, each configured to modify a polarization of light incident thereon; and two polarizers configured to allow light having a first polarization state to propagate therethrough and light having a second polarization state to reflect therefrom, wherein:

two of the five mirrors and a first one of the two retarder elements are positioned on the first side of the gain medium, and three of the five mirrors and a second one of the retarder elements are positioned on the second side of the gain medium.

14. The multi-pass optical amplifier of claim 13, wherein a first polarizer is positioned to receive the optical pulse, a Faraday rotator is positioned between the first polarizer and a first retarder element of the two retarder elements, wherein the first retarder element includes a half waveplate (HWP), a second polarizer is positioned between the first retarder element and the first side of the gain medium, a first mirror is positioned to receive light that exits the gain medium from the second side and to reflect it at an angle to a second mirror, a third mirror is positioned to receive light upon reflection from the second mirror and passage through a second retarder element of the two retarder elements that includes a quarter waveplate (QWP), and a fourth mirror positioned to receive light that is reflected from the second polarizer and direct light reflected therefrom to a fifth mirror that is configured to reflect light received thereon toward the fourth mirror.

15. The multi-pass optical amplifier of claim 14, wherein a distance between the gain medium and the third mirror or a distance between the gain medium and the fifth mirror is selected to be greater than a predetermined value that causes the main component of the optical pulse to substantially completely traverse through the gain medium as part of a current pass through the gain medium before the leading component of the optical pulse reaches the gain medium as part of a subsequent pass through the gain medium, wherein the current pass is the second pass or higher.

16. The multi-pass optical amplifier of claim 14, wherein the optical pulse input to the multi-pass optical amplifier is linearly polarized.

17. The multi-pass optical amplifier of claim 14, wherein the second retarder element does not receive light from a laser pump source.

18. The multi-pass optical amplifier of claim 1, wherein the one or more reflectors are positioned at the one or more distances from the gain medium to enable the main component of the optical pulse to be amplified while amplification of the leading or trailing components are minimized after multiple passes through the gain medium.

19. The multi-pass optical amplifier of claim 1, wherein the multi-pass optical amplifier is a double-pass optical amplifier.

20. The multi-pass optical amplifier of claim 19, wherein the double-pass optical amplifier comprises:

a polarizer configured to receive the optical pulse, a quarter waveplate (QWP) positioned between the first side of the gain medium and the polarizer, and a mirror positioned to receive light that exits the gain medium at the second side of the gain medium, and to reflect the light received therein back toward the second side of the gain medium.

* * * * *